(12) United States Patent
Criswell

(10) Patent No.: US 11,866,348 B2
(45) Date of Patent: Jan. 9, 2024

(54) SYSTEM, APPARATUS, AND METHOD FOR TREATING WASTEWATER IN REAL TIME

(71) Applicant: Denny Allen Criswell, Southlake, TX (US)

(72) Inventor: Denny Allen Criswell, Southlake, TX (US)

(*) Notice: Subject to any disclaimer, the term of this patent is extended or adjusted under 35 U.S.C. 154(b) by 0 days.

(21) Appl. No.: 16/680,197

(22) Filed: Nov. 11, 2019

(65) Prior Publication Data

US 2020/0079661 A1    Mar. 12, 2020

Related U.S. Application Data

(63) Continuation-in-part of application No. 15/788,702, filed on Oct. 19, 2017, now abandoned, which is a
(Continued)

(51) Int. Cl.
    *C02F 1/24* (2023.01)
    *C02F 1/52* (2023.01)
    (Continued)

(52) U.S. Cl.
    CPC .............. *C02F 1/24* (2013.01); *B01D 21/01* (2013.01); *B01D 21/32* (2013.01); *B03D 1/1431* (2013.01); *C02F 1/008* (2013.01); *C02F 1/5209* (2013.01); *B03D 1/028* (2013.01); *C02F 1/5245* (2013.01); *C02F 1/56* (2013.01); *C02F 1/66* (2013.01); *C02F 2209/003* (2013.01); *C02F 2209/005* (2013.01); *C02F 2209/006* (2013.01); *C02F 2209/06* (2013.01); *C02F 2209/10* (2013.01);
    (Continued)

(58) Field of Classification Search
    CPC . C02F 1/24; C02F 1/008; B01D 21/01; B01D 21/32
    See application file for complete search history.

(56) References Cited

U.S. PATENT DOCUMENTS 5,560,060 A * 10/1996 Dausch ............... A47L 15/0047
                                                             8/158
6,110,382 A *  8/2000 Wiemers ................. C02F 9/00
                                                             175/66
(Continued)

OTHER PUBLICATIONS

Astrom, K.J., "Control System Design", Chapter 6: PID Control; 2002, pp. 216-251.
(Continued)

Primary Examiner — Ryan B Huang
(74) Attorney, Agent, or Firm — Perkins Coie LLP

(57) ABSTRACT

Introduced here are systems for treating a wastewater stream to produce an effluent stream. A treatment system can include a sensor for measuring a characteristic of the wastewater stream and/or the effluent stream, a pump for supplying a chemical additive to the wastewater stream, and a controller for varying the flow rate of the chemical additive based on real-time analysis of measurements generated by the sensor. The characteristic could be, for example, turbidity, pH, total suspended solids (TSS), etc. Some embodiments of the treatment system further include a flow meter for measuring flow of the wastewater stream. In such embodiments, the controller may vary the flow rate of the chemical additive based on the measurements generated by the sensor and the flow meter.

17 Claims, 9 Drawing Sheets

Related U.S. Application Data continuation of application No. 15/624,291, filed on Jun. 15, 2017, now abandoned, which is a continuation of application No. 13/401,732, filed on Feb. 21, 2012, now Pat. No. 9,682,872.

(51) Int. Cl.
  *B01D 21/01* (2006.01)
  *B01D 21/32* (2006.01)
  *B03D 1/14* (2006.01)
  *C02F 1/00* (2023.01)
  *C02F 1/56* (2023.01)
  *B03D 1/02* (2006.01)
  *C02F 1/66* (2023.01)

(52) U.S. Cl.
  CPC ....... *C02F 2209/11* (2013.01); *C02F 2209/40* (2013.01)

(56) References Cited

U.S. PATENT DOCUMENTS

| | | | |
|---|---|---|---|
| 6,577,908 | B1 | 6/2003 | Wojsznis et al. |
| 9,682,872 | B2 | 6/2017 | Criswell |
| 2008/0046127 | A1 | 2/2008 | Piironen et al. |
| 2008/0047903 | A1 | 2/2008 | Morse et al. |
| 2010/0224569 | A1* | 9/2010 | Mitzlaff ................ C02F 1/5209 210/745 |
| 2011/0132815 | A1* | 6/2011 | Angelilli .................. C02F 1/76 210/88 |
| 2011/0155255 | A1 | 6/2011 | Ladron de Guevara et al. |
| 2012/0000859 | A1 | 1/2012 | Mitzlaff et al. |
| 2013/0213895 | A1 | 8/2013 | Criswell |
| 2017/0341953 | A1 | 11/2017 | Criswell |
| 2018/0037471 | A1 | 2/2018 | Criswell |

OTHER PUBLICATIONS

Haimi, Henri, et al., "Process Automation in Wastewater Treatment Plants: The Finnish Experience", Official Publication of the European Water Association (EWA), 2010, pp. 1-17.

Han, Tae-Hwan, et al., "Optimization of Coagulant Dosing Process in Water Purification System", SICE '97, Tokushima, Jul. 29-31, 1997, pp. 1105-1109.

Keskar, P.Y, "Water Supply Plant Controls", Process Control and Optimization, Chapter 8, Ed. Liptak, 2006, pp. 2172-2193.

* cited by examiner

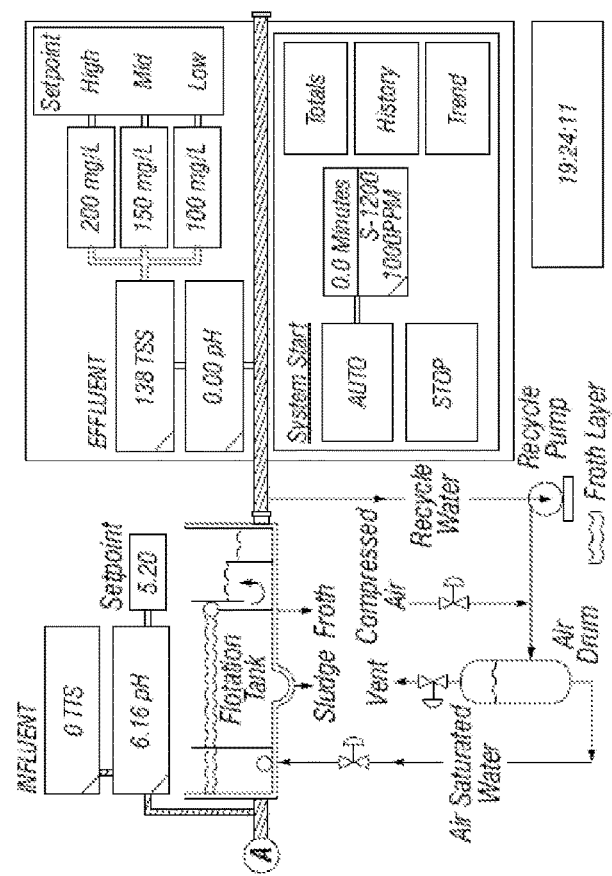
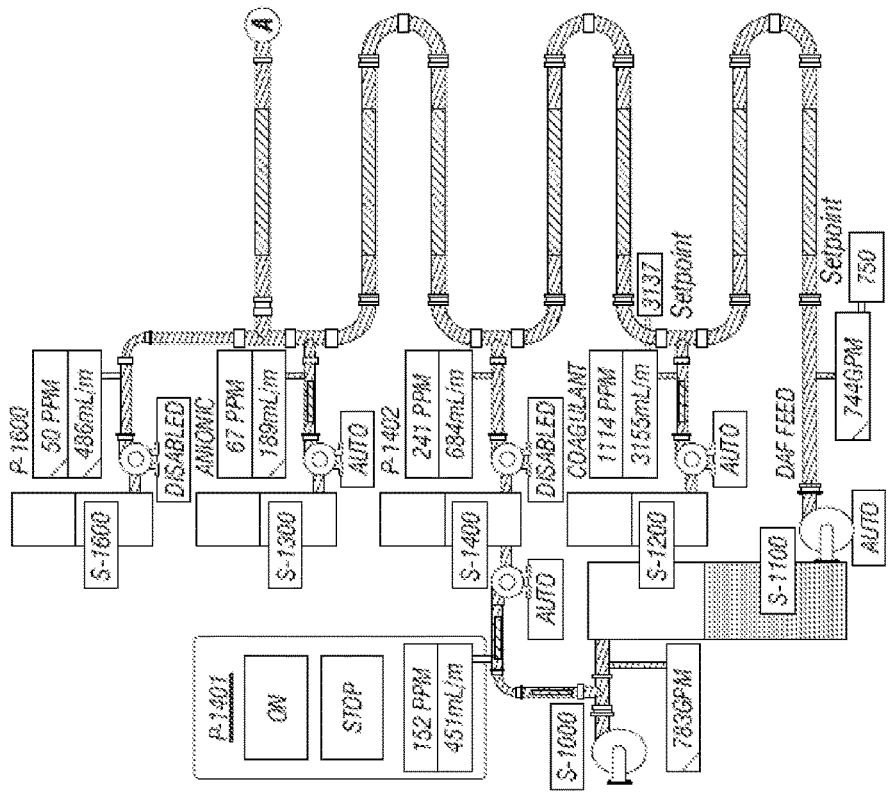
FIG. 3

600

601

Supply a chemical additive to a wastewater stream at a variable flow rate

602

Continuously measure clarity of the wastewater stream and/or an effluent stream produced from the wastewater stream

603

Continuously measure flow of the wastewater stream

604

Vary the variable flow rate of the chemical additive based on the clarity measurements and/or the flow measurements

605

Maintain clarity of the effluent stream within a specified range by continually injecting the chemical additive into the wastewater stream responsive to adjustments specified in real time

701
Produce a flow rate value by continually measuring flow of a wastewater stream 702
Produce a clarity value by continually measuring clarity of the wastewater stream 703
Determine an appropriate chemical additive flow rate based on the flow rate value and the clarity value 704
Output a signal to a pump that causes an amount of chemical additive to be injected into the wastewater stream 705
Continually monitor the flow rate value and/or the clarity value to determine whether an adjustment to the amount of chemical additive is needed to maintain clarity of the effluent stream at a substantially steady level after reaching the specified effluent quality level

FIGURE 7

SYSTEM, APPARATUS, AND METHOD FOR TREATING WASTEWATER IN REAL TIME

CROSS-REFERENCE TO RELATED APPLICATIONS

This application is a continuation-in-part of U.S. application Ser. No. 15/788,702, titled "Wastewater Treatment System" and filed on Oct. 19, 2017, which is a continuation of U.S. application Ser. No. 15/624,291, titled "Wastewater Treatment System" and filed on Jun. 15, 2017, which is a continuation of U.S. Pat. No. 9,682,872, titled "Wastewater Treatment System" and issued on Jun. 20, 2017. Each of these applications is incorporated by reference herein in its entirety.

TECHNICAL FIELD

Various embodiments concern systems, apparatuses, and methods for treating wastewater to produce a chemically-acceptable effluent stream. In particular, various embodiments relate to an automated system capable of controlling/adjusting the levels of contaminants present in the wastewater in real time.

BACKGROUND

The treatment of industrial wastewater is a necessary yet difficult task that must be performed by most, if not all, manufacturing facilities. A vast array of contaminants that are byproducts of manufacturing processes may need to be removed from a wastewater stream. For instance, the wastewater stream may carry contaminants in the form of suspended solids that range in size, composition, type, etc. Examples of contaminants include oils, surfactants, polymers, acids, fats, blood, process ingredients, metal salts, and the like. It is often necessary to remove and/or neutralize these contaminants to create an effluent stream that meets the minimum standards of wastewater treatment for a given locale prior to releasing the effluent into a sewage system.

A variety of systems that employ different technical approaches to treating wastewater have attempted to solve these problems. For example, systems that employ tanks and/or weirs for separating contaminants from liquids through sedimentation have been widely used over the last several decades. Sedimentation in tanks is often accompanied by the use of a filtration system (e.g., that employs filters or screens) to remove small solid particles from the effluent stream. However, filtration systems require a great deal of maintenance and are subject to clogging, which will impede flow through these filtration systems.

Systems that employs dissolved air flotation (DAF) have been employed with some degree of success. DAF is a process that clarifies wastewater by the removal of suspended matter, such as oil or solids, through the introduction of air bubbles. Generally, air bubbles are introduced at a lower portion of a tank to carry matter suspended in the wastewater to the surface. The matter at the surface will aggregate together, either naturally or through the use of coagulant additive(s), thereby permitting removal of at least some of the matter in the wastewater. Effluent can then be drawn from the lower portion of the tank.

In many instances, the pH of the effluent stream must meet a predetermined standard prior to release into a sewage system. Accordingly, the pH of the wastewater will normally need to be modified to an acceptable level by the addition of acid(s) or base(s). Frequent testing of the pH of the effluent may be necessary to maintain proper pH balance.

Chemical additives (or simply "chemicals") are normally required to treat wastewater (also referred to as a "contaminated stream" or a "wastewater stream"). Examples of chemical additives include coagulants and polymers. Historically, operators of manufacturing facilities have conducted jar tests to establish the appropriate assortment of chemical additive(s) for treating a given stream of wastewater. A "jar test" is a pilot-scale laboratory test that simulates the coagulation/flocculation under different chemical doses. For instance, the operator may place samples of the wastewater within multiple jars, and then the operator may treat the wastewater within each jar with a different chemical additive, a different combination of multiple chemical additives, or a different amount of the same chemical additive. By performing these jar tests, the operator can establish which chemical additive (or combination of multiple chemical additives) results in effluent that is acceptable for discharge. The amount of chemical additive(s) needed to treat the wastewater are then recorded, and the flow rate of each chemical additive is calculated based on the flow rate of wastewater into the treatment system. Once the proper flow rate is established for each chemical additive, the chemical additive(s) can be supplied by pumps that are set to deliver the proper additive flows.

One difficulty encountered by this type of treatment system is that if the flow of wastewater changes appreciably (e.g., by at least 3%, 5%, or 10%), the flow rate of each chemical additive must be adjusted. However, such an adjustment requires additional jar tests. Additionally, a change in wastewater flow may require that the pump(s) be adjusted because the proportion of chemical additive(s) must be adjusted proportionally to the wastewater flow. Furthermore, at many manufacturing facilities it is impractical to train personnel to monitor the effluent, conduct jar tests with sufficient frequency, calculate the flow rate of each chemical additive, adjust the pump(s), and carefully monitor the wastewater flow in order to maintain the treatment system's operation.

Attempts have been made to automate this process (see, for example, US Publication Nos. 2010/0224569 and 2012/0000859), but the results obtained by these treatment systems have been less than satisfactory. For example, some treatment systems use a programmable logic controller (PLC) to perform jar tests that derive an appropriate dosage for a chemical additive. This dosage is then implemented/maintained via a proportional feed (i.e., by considering chemical-to-water flow). A nephelometer can be used in such a treatment system to measure turbidity in Nephelometric Turbidity Units (NTUs). A controller can consider whether additional jar tests are necessary based on the output of the nephelometer (also referred to as an "NTU meter"), and this process can repeat indefinitely.

Such a treatment system does not automatically adjust flow rate on a per-chemical-additive basis in real time. Accordingly, while such a treatment system may reduce the time needed to provide clarity values to the controller, especially when the NTU meter is positioned in the wastewater stream, the treatment system uses that time (and more) to wait for the completion of the jar tests. Such delay compromises the accuracy of any measurements made, as well as the integrity of removal of contaminants from the wastewater.

Accordingly, there is a need for an automated treatment system that is capable of monitoring an effluent stream for out-of-range contaminant levels and then adjusting the flow rate of chemical additive(s) in real time as necessary.

SUMMARY

The technology described herein obviates the aforementioned problems inherent to conventional treatment systems by allowing an effluent stream within a desired turbidity/pH range to be produced from a wastewater stream without the need for the costly, time-consuming jar tests.

In particular, a treatment system can include a controller (e.g., an industrial controller having a microprocessor), a memory, and a plurality of inputs and outputs that interface with various components of the treatment system, as set forth in greater detail below. The controller can be operatively coupled to sensor(s) that provide a signal representative of the measured variable at point(s) in the effluent stream. The sensors may include, for example, turbidity meters, pH meters, etc. Then, the controller can determine whether the values generated by the sensor(s) are within an acceptable range (e.g., an acceptable turbidity range if the sensors are turbidity meters, or an acceptable pH range if the sensors are pH meters).

The treatment system may include a plurality of pumps for supplying a plurality of chemical additives to the wastewater stream to control the turbidity/pH thereof. Each pump is operatively coupled to the controller, which supplies a separate flowrate setpoint signal to each pump to control the balance of chemical additive(s) introduced to the wastewater stream.

As further described below, these chemical additive(s) can be added based on the signals produced by a tuned proportional-integral-derivative (PID) controller. A PID controller is a control loop feedback mechanism that continually calculates an error value (e(t)) as the difference between a desired setpoint (SP=r(t)) and a measured process variable (PV=y(t)) and then applies a correction based on proportional, integral, and derivative terms (denoted as P, I, and D respectively). The PID controller will attempt to minimize the error over time by adjusting a control variable (u(t)) to a new value determined by a weighted of the proportional, integral, and derivative terms. Here, the control variable is the flowrate of a given chemical additive, and the PID controller can manage the flowrate of each chemical additive to be introduced to the wastewater stream independently. With regard to the integral and derivative terms, the treatment system can be designed such that the PID controller does not automatically increase the amount of chemical additive(s) introduced into the wastewater stream merely because the flowrate of the wastewater stream increases. Rather, the treatment system can increase the flow of chemical additive(s) based on the flowrate of the wastewater stream and its clarity. Moreover, the treatment system may accomplish this in a PID format. The further away from the setpoint, regardless of flowrate of the wastewater stream, the faster the treatment system may drive the pump(s) responsible for introducing the chemical additive(s) into the wastewater stream.

These adjustments may be made in real time based on a characteristic of the wastewater stream, such as turbidity or potential of hydrogen (pH). For example, the treatment system may use a sampling interval that is set at 33%, 50%, 75%, or 95% of a minute. Thus, the PID controller may determine whether a chemical additive flowrate should be varied based on turbidity/pH measurements that are generated every 20, 30, 45, or 57 seconds. Those skilled in the art will recognize that measurements could be generated at a greater frequency (e.g., a measurement every 2, 3, or 5 seconds) or a lesser frequency (e.g., a measurement every 60, 120, or 180 seconds). Because the chemical additive flowrate can be varied in real time (e.g., in response to generating a turbidity/pH measurement for the wastewater stream), the treatment system need not wait for a series of jar tests to conclude.

In the case of multiple chemical additives, the chemical additives may be fed into the wastewater stream as a proportion unto themselves. For example, for every part-per-million (PPM) of a first chemical additive (e.g., a coagulant), the treatment system may feed two PPM of a second chemical additive (e.g., a flocculent). Similarly, the treatment system can be configured to feed acids and bases into the wastewater stream to produce an effluent stream having a desired pH level, again in PID format.

BRIEF DESCRIPTION OF THE DRAWINGS

Various features of the technology will become more apparent to those skilled in the art from a study of the Detailed Description in conjunction with the drawings. Embodiments of the technology are illustrated by way of example and not limitation in the drawings, in which like references may indicate similar elements.

FIG. 3 includes an example of an interface illustrating how a wastewater treatment system can introduce chemical additives into a wastewater stream.

FIG. 6 depicts a flow diagram of a process for treating a wastewater stream to produce an effluent stream.

FIG. 7 depicts a flow diagram of another process for treating a wastewater stream to produce an effluent stream.

Figure 1:
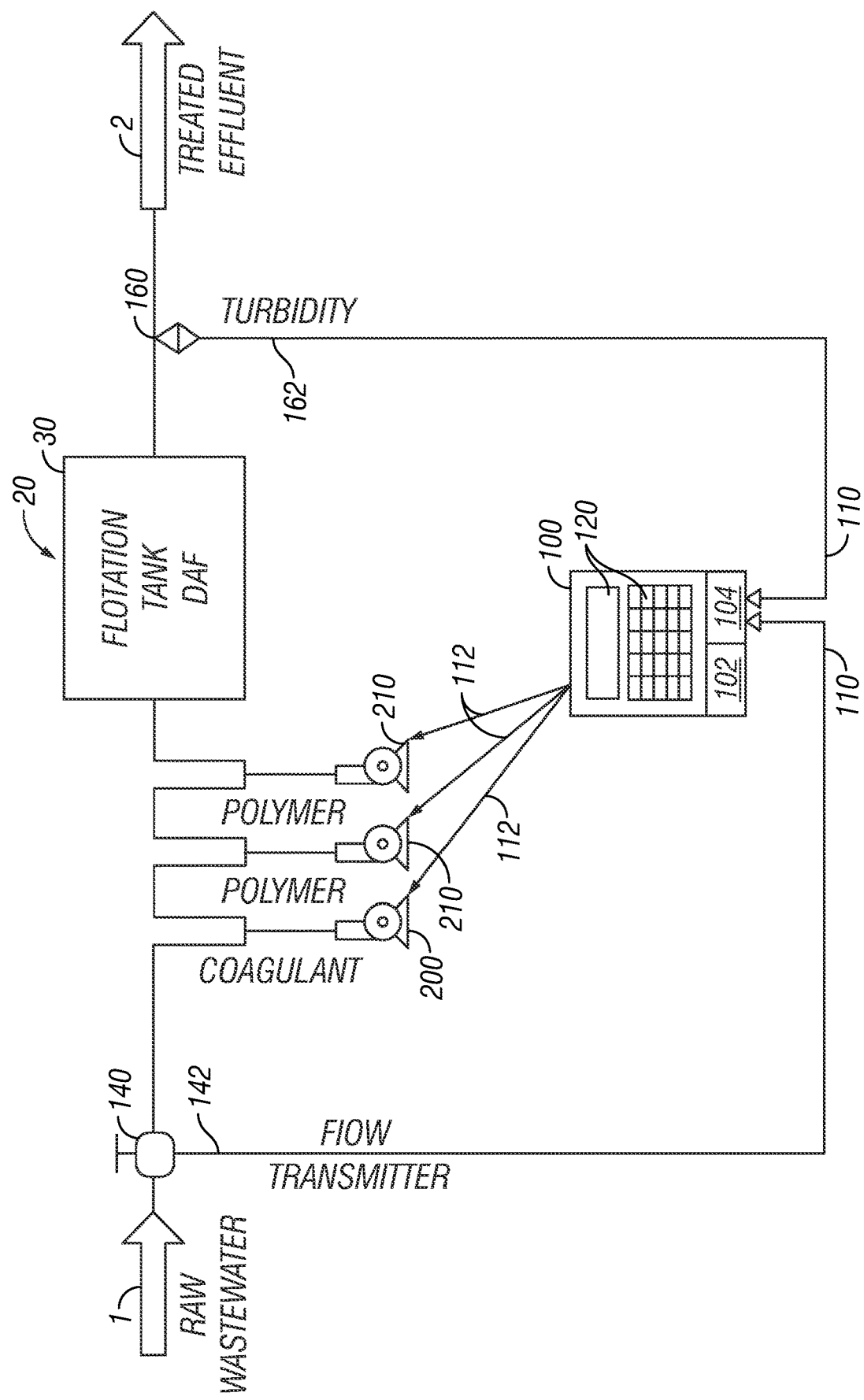
FIG. 1 includes a high-level diagrammatic representation of a wastewater treatment system in accordance with an embodiment.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

Wastewater treatment is the process by which contaminants are removed from wastewater to convert it into effluent that can be returned into the environment with minimal impact. Many manufacturing processes result in the production of contaminants that need to be removed from wastewater before it is discharged. Examples of contaminants include oils, surfactants, polymers, acids, fats, blood, process ingredients, metal salts, and the like. These materials may need to be removed/neutralized to create effluent that meets the minimum standards set forth by a given locale.

As discussed above, a variety of different treatment systems have been developed in an attempt to solve this problem. However, these treatment systems are unable to monitor an effluent stream for out-of-range contaminant levels and then adjust the flow rate of chemical additive(s) injected into a wastewater stream in real time as necessary.

Introduced here, therefore, are treatment systems able to treat wastewater streams in real time by continually monitoring an effluent stream. As further discussed below, these treatment systems are able to alter the rate at which chemical additive(s) are injected into a wastewater stream every few seconds rather than every few minutes or hours. Accordingly, these treatment systems can be designed to produce an effluent stream within a desired turbidity/pH range from a wastewater stream without the need for the costly, time-consuming jar tests that are performed by conventional treatment systems.

The technology can be embodied using special-purpose hardware (e.g., circuitry), programmable circuitry appropriately programmed with software and/or firmware, or a combination of special-purpose hardware and programmable circuitry. Accordingly, embodiments may include a machine-readable medium having instructions that may be used to program an electronic device to perform a process for examining clarity measurements generated by a sensor disposed in a wastewater stream, examining flow measurements generated by a flow meter disposed in the wastewater stream, and varying the flow rate of a chemical additive supplied to the wastewater stream based on the clarity measurements and the flow measurements to maintain clarity of an effluent stream within a specified range.

Terminology

References in this description to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to"). The terms "connected," "coupled," or any variant thereof is intended to include any connection or coupling between two or more elements, either direct or indirect. The coupling/connection can be physical, logical, or a combination thereof. For example, devices may be electrically or communicatively coupled to one another despite not sharing a physical connection.

The term "based on" is also to be construed in an inclusive sense rather than an exclusive or exhaustive sense. Thus, unless otherwise noted, the term "based on" is intended to mean "based at least in part on."

When used in reference to a list of multiple items, the word "or" is intended to cover all of the following interpretations: any of the items in the list, all of the items in the list, and any combination of items in the list.

The sequences of steps performed in any of the processes described here are exemplary. However, unless contrary to physical possibility, the steps may be performed in various sequences and combinations. For example, steps could be added to, or removed from, the processes described here. Similarly, steps could be replaced or reordered. Thus, descriptions of any processes are intended to be open-ended.

Technology Overview

A treatment system can include a controller (e.g., an industrial controller having a microprocessor), a memory, and a plurality of inputs and outputs that interface with various components of the treatment system, as set forth in greater detail below. The controller can be operatively coupled to sensor(s) that provide a signal representative of the measured variable at point(s) in a wastewater stream, an effluent stream, or any combination thereof. The sensors may include, for example, turbidity meters, pH meters, etc. For example, a treatment system could include a first sensor disposed in the wastewater stream and a second sensor disposed in the effluent stream. As another example, a treatment system could include a sensor (or multiple sensors) disposed in the effluent stream. While embodiments may be described in the context of turbidity sensors for the purpose of illustration, those skilled in the art will recognize that the features are similarly applicable to other types of sensors.

Accordingly, the controller may be operatively coupled to a turbidity meter (or a plurality thereof) that provides a signal representative of turbidity at a corresponding point (or points) in the effluent stream. The controller can determine, based on the signal, whether the effluent stream is within an acceptable range. Here, for instance, the controller can determine whether the effluent stream is within an acceptable turbidity range.

The treatment system may include a plurality of pumps for supplying a plurality of chemical additives to the wastewater stream to control the turbidity thereof. Each pump is operatively coupled to the controller, whereby the controller supplies a plurality of flowrate setpoint signals that are used to determine the proper balance of chemical additives to produce the desired turbidity reading. The controller may supply a separate flowrate setpoint signal to each pump to control the balance of chemical additive(s) introduced to the wastewater stream.

A key aspect of the technology describe herein involves the use of a controller, such as a programmable logic controller (PLC), that includes a proportional-integral-derivative (PID) controller. A PID controller is a control loop feedback mechanism that continually calculates an error value ($e(t)$) as the difference between a desired setpoint ($SP=r(t)$) and a measured process variable ($PV=y(t)$) and then applies a correction based on proportional, integral, and derivative terms (denoted as P, I, and D respectively). The PID controller will attempt to minimize the error over time by adjusting a control variable ($u(t)$) to a new value determined by a weighted of the proportional, integral, and derivative terms.

Calculations performed by the PID controller involve three separate parameters: the proportional value (P), the integral value (I), and the derivative value (D). Heuristically, these values can be interpreted in terms of time:

P depends on the present error;
I depends on the accumulation of past errors; and
D is a prediction of future errors, based on current rate of change.

The weighted sum of these three values can be used to adjust the addition of chemical additive(s) to the effluent stream via a control element. For example, the controller may control the position of a valve or the power applied to a pump based on these three values.

Tuning these three parameters in the algorithm executed by the PID controller involves inputting the proper gain values for all three of the loops (P, I, and D). Because these loops are all interdependent, a number of tuning devices may be used for on-line tuning and/or off-line tuning. Depending upon the equipment available and the objective of the treatment system of interest, the first tuning may be performed off-line. The treatment system can then be brought on-line, and the loops can be fine tuned to provide the desired performance.

The controller provides control action designed for specific process requirements, such as a desired value for turbidity, pH, etc. The response of the controller can be described in terms of responsiveness to an error, the degree to which the controller overshoots the setpoint, and the degree of treatment system oscillation. In particular, the controller may be set to meet a performance objective, a costing objective, or a combination of performance and costing objectives. For example, in a treatment system that is installed where compliance is paramount, the controller may be set with high gain values for the proportional and integral values to ensure a quick and thorough response to an elevation in contamination in the effluent stream. This leads to an acceptable level of chemical overfeed and the subsequent costs associated with it. Conversely, a treatment system may be tuned to provide maximum cost efficiency by inputting lower gain values for the proportional and integral values and a higher gain value for the derivative value. This will lead to a less responsive treatment system that minimizes chemical overshooting and the subsequent costs associated with it, while still keeping the treatment system in compliance. Depending on the contaminants and acceptable levels, either strategy could be used successfully.

This control scheme may be named the "PID control scheme" after its three correcting terms, whose sum constitutes the manipulated variable (MV). The proportional, integral, and derivative terms are summed to calculate the output produced by the PID controller. Defining u(t) as the output, the final form of the algorithm is:

$$u(t) = MV(t) = K_p e(t) + K_i \int_0^t e(\tau) d\tau + K_d \frac{d}{dt} e(t)$$

where
$K_p$: Proportional gain, a tuning parameter;
$K_i$: Integral gain, a tuning parameter;
$K_d$: Derivative gain, a tuning parameter;
e: Error=SP−PV; and
t: Time or instantaneous time (the present).

The contribution of the integral term is proportional to both the magnitude of the error and the duration of the error. The integral in a PID controller is the sum of the instantaneous error over time and gives the accumulated offset that should have been corrected previously. The accumulated error is then multiplied by the integral gain (K) and added to the output.

The integral term is given by:

$$I_{out} = K_i \int_0^t e(\tau) d\tau.$$

The integral term accelerates the movement of the process towards the setpoint. In an embodiment, the integral term is used to achieve the desired effluent quality, the value of which may be preset, in the fastest time possible with minimal chemical overshoot.

Given the interdependency of each loop, the gain for the integral can be set at the highest value possible for the quickest recovery by the treatment system. This ensures that effluent quality is returned to an acceptable level for discharge in the shortest time possible. For example, a treatment system with a large amount of variation in contaminant loading may require a higher gain in the integral function to accommodate its loading swings. An integral gain that is set too low will allow the treatment system to run for an unacceptably long period of time outside of the acceptable range. Conversely, a treatment system with a low amount of variation in contaminant loading requires a lower gain in the integral function.

The derivative of the process error is calculated by determining the slope of the error over time and then multiplying this rate of change by the derivative gain ($K_d$). The magnitude of the contribution of the derivative term to the overall control action is termed the derivative gain ($K_d$).

The derivative term is given by:

$$D_{out} = K_d \frac{d}{dt} e(t)$$

The derivative term slows the rate of change of the output produced by the PID controller. Derivative control is used to reduce the magnitude of the overshoot produced by the integral component and improve the combined controller-process stability. In an embodiment, the derivative term is used to allow for a rapid response dosing scheme, achieved with a proper gain in the integral loop, without overdosing the treatment system due to an overshoot.

Given the interdependency of each loop, the derivative gain can be set at the highest value possible to ensure the lowest chemical overshoot. For example, a treatment system with a small amount of variation in contaminant levels could be run with a large gain value. This ensures that the small changes in chemical dosing needed for treatment are done with a minimal amount of overshooting. Conversely, a treatment system with a large amount of variation in the levels of contamination needs a small derivative gain inputted to allow the treatment system to make a quick recovery back to the desired setpoint. That setpoint being the one that gives the desired effluent quality for the concentration of contaminants being treated.

Conventional treatment systems, which are, at best, semi-automated, have a separation device that typically has less than 20 minutes of retention, which means that the half-life of a treatment solution is about 20 minutes. In contrast thereto, the controller described herein can respond uniformly to a Nephelometric Turbidity Unit (NTU) output in worst-case scenarios at one-half of a half-life. For example, the controller may continually monitor the clarity of an effluent stream using a sensor disposed within the effluent stream. Based on measurements generated by the sensor, the controller can vary the flow rate of a chemical additive supplied directly into the corresponding wastewater stream. Thus, the flow rate of the chemical additive can be varied in real time based on characteristic(s) of the wastewater stream and/or the effluent stream without the need for a separation device.

The treatment system described herein can add chemical additive(s) based on a derivative term. With regard to the derivative term, the treatment system may operate such that the controller does not automatically increase the volume of chemical additive(s) merely because the flow rate of the wastewater stream goes up. Rather, the treatment system can increase chemical additive(s) based on flow and/or water clarity, and the treatment system may only do this in a derivative format. The further away from the setpoint, regardless of the flowrate of the wastewater stream, the faster the treatment system can drive the pump(s) responsible for supplying the chemical additive(s) into the wastewater stream.

To accomplish this, the treatment system can use an interval term that is set at 10%, 25%, 33%, 50%, 75%, or 95% of a minute. Thus, the treatment system may sample the wastewater stream (or the effluent stream) every 6 seconds, 15 seconds, 20 seconds, 30 seconds, 45 seconds, or 57 seconds. Those skilled in the art will recognize that measurements could be generated at a greater frequency (e.g., a measurement every 2, 3, or 5 seconds) or a lesser frequency (e.g., a measurement every 60, 120, or 180 seconds). For example, an NTU meter may generate a measurement indicative of the clarity of the effluent stream every 57 seconds, and a controller may make a change to a chemical additive flowrate, if needed, as a function of a proportional, integral, and derivative output based on the measurement without separating water from the effluent stream (e.g., to perform a series of jar tests).

In the case of multiple chemical additives, the chemical additives may be fed into the wastewater stream as a proportion unto themselves. For example, for every part-per-million (PPM) of a first chemical additive (e.g., a coagulant), the treatment system may feed two PPM of a second chemical additive (e.g., a flocculent). Similarly, the treatment system can be configured to feed acids and bases into the wastewater stream to produce an effluent stream having a desired pH level, again in PID format.

FIG. 1 depicts an example of a system for treating a wastewater stream 1 to produce an effluent stream 2 having a contaminant concentration that is below a predetermined threshold. An embodiment comprises a wastewater treatment facility 20 having a settling clarifier or dissolved air flotation (DAF) tank 30, a wastewater inlet 40 through which contaminated wastewater is provided to the DAF tank 30, and an effluent outlet 50 through which treated wastewater is drawn from the DAF tank 30. In some embodiments, one or more flocculent ("floc") tubes, or some other type of mixing device, may be provided between the wastewater inlet 40 and the DAF tank 30 to mix chemical additive(s) with the wastewater 1 prior to its introduction into the DAF tank 30.

The DAF tank 30 may comprise a DAF device for introducing air bubbles into the wastewater 1, thereby aiding in separation and flotation of coagulated solids to the surface of the DAF tank 30. It should be noted that throughout this specification for purposes of clear explanation the invention may be described in the context of operation within a DAF wastewater treatment facility. However, the invention may be practiced in conjunction with a broad spectrum of wastewater filtration systems, such as sedimentation systems, clarifiers, separators, equalization tanks, and the like, without departing from the scope of the invention.

The exemplary system can further comprise a controller 100 having a microprocessor 102, or a plurality thereof, and concomitant data memory 104 for storing process variables. The controller can comprise a plurality of inputs 110 for accepting electrical signals from system components and a plurality of outputs 112 for supplying signals to system components. Additionally, an interface 120 may be operatively coupled to the controller 100 to enable an operator (also referred to as a "user") to monitor and control operation of the system, as discussed further herein below. The controller 100 may comprise one of many commercially available controllers including but not limited to programmable logic controllers (PLCs) having configurable input and output cards, distributed logic controllers, personal computers, or proprietary microprocessors having the requisite inputs and outputs to control the system. Furthermore, the interface 120 may comprise one of many commercially available interfaces with video displays, touchscreens, keyboards, and the like to permit user control of the system. FIG. 3 provides an example of an interface in accordance with an embodiment of the invention herein.

Figure 2:
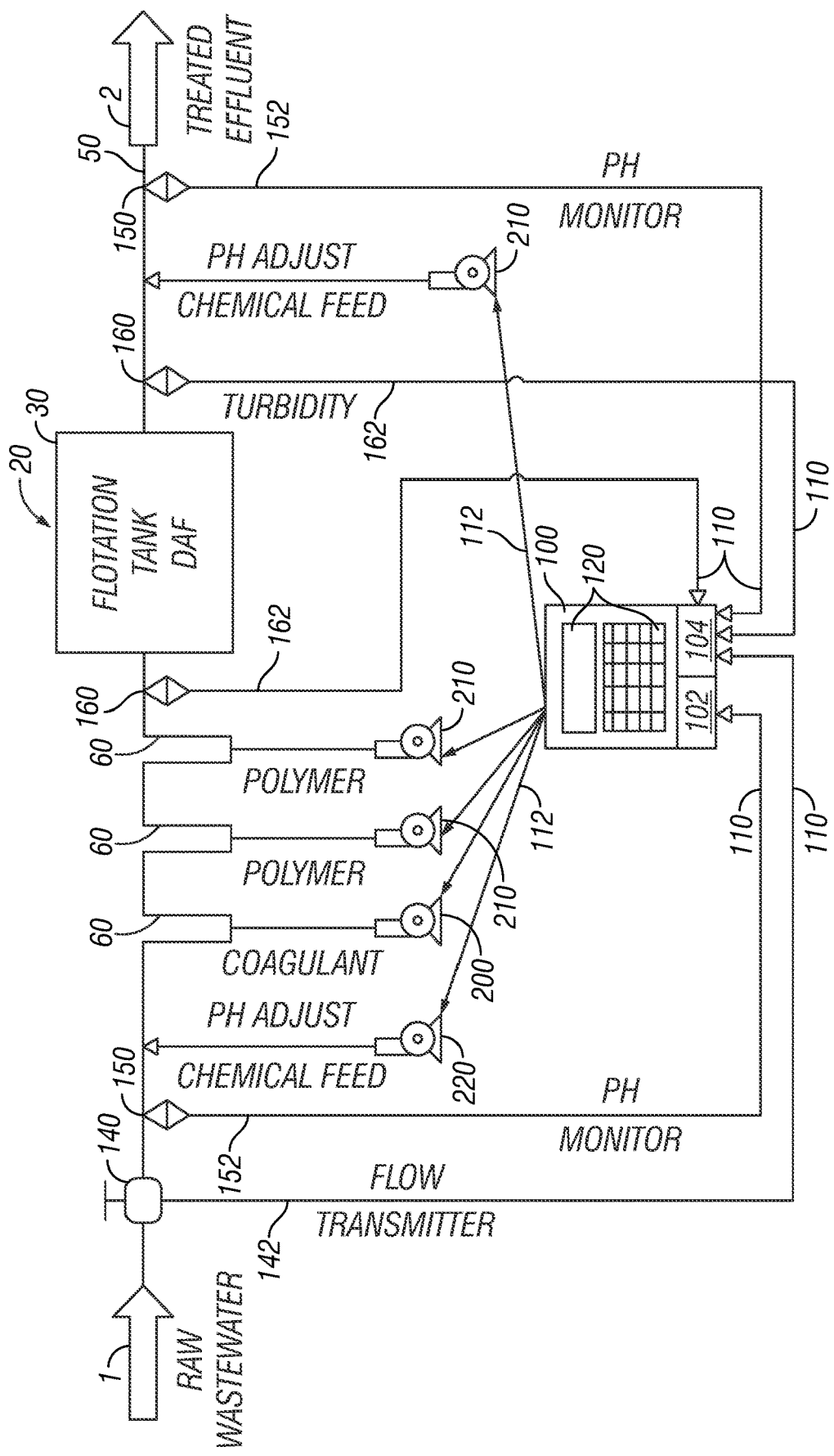
FIG. 2 includes a high-level diagrammatic representation of a wastewater treatment system in accordance with another embodiment.

In an embodiment, the system further includes a flow meter 140 that is disposed in the wastewater inlet 40 and capable of measuring the flowrate of wastewater through the inlet 40. The flow meter 140 may generate an output signal 142 representative of wastewater flow, and the output signal 142 may be operatively coupled to an input 110 of the controller 100 so that the controller 100 can monitor the flowrate of wastewater entering the system. As shown in FIG. 2, a pH meter 150 may be provided proximate the wastewater inlet 40. The pH meter 150 may generate an output signal 152 representative of the pH of the wastewater stream 1 prior to treatment, and the output signal 152 may be operatively coupled to an input 110 of the controller 100. Additionally, a pH meter 150 may be disposed proximate the effluent outlet 50, such that the controller 100 may monitor pH in the effluent stream.

As best seen in FIGS. 1-2, a turbidity meter 160 can be provided in fluid communication with the effluent outlet 50 for measuring the clarity of the wastewater effluent following treatment. The turbidity meter 160 comprises an output 162 representative of turbidity, as measured by any one of several standards, including NTUs or Jackson Turbidity Units (JTUs). The turbidity meter 160 is operatively coupled to an input 110 of the controller 100. For purposes of explanation only, the specification may refer to the measure of turbidity in NTUs.

FIG. 2 depicts an alternative embodiment of the invention, where a second turbidity meter 160 is provided in the wastewater stream 1 at a point downstream of the floc tube(s) 60 (or another mixing device) but upstream of entry into the DAF tank 30 for monitoring the turbidity of wastewater 1 that has been treated in the floc tube(s) 60, as will be discussed in greater detail herein below.

The system further comprises a plurality of chemical additive pumps (or simply "pumps") for supplying metered quantities of chemical additives to the wastewater stream 1. FIG. 1 depicts an embodiment of the system having three pumps: a coagulant pump 200 and a pair of polymer pumps 210. Each pump is in fluid communication with the wastewater stream 1 proximate the inlet 40 and floc tube(s) 60 and upstream of the turbidity meter 160, whereby a metered flow of coagulant and polymers may be supplied to the wastewater stream. Pumps 200 and 210 are operatively coupled to the outputs 112 of the controller 100, which provides an electrical signal representative of a desired chemical additive flowrate to pumps 200 and 210, whereby the controller 100 may meter chemical additives being supplied by the system based upon desired effluent turbidity or other contaminant measure(s).

In an embodiment of the invention, the pumps 200 and 210 may comprise positive displacement pumps or other commercially available pumps that are capable of accurately metering fluid from a storage tank (not shown) to the system. The pumps 200 and 210 may be operated by providing an output 112 to a variable frequency drive which, in turn, varies the rotational speed of the shaft of an electric motor used to power the pumps 200, 210, as is known in the art. Alternatively, various metering pumps capable of delivering measured fluid volumes may be employed without departing from the scope of the invention.

Typically, the coagulant pump 200 may deliver a coagulant to the floc tube(s) 60 or some other convenient point of chemical constituent injection. Examples of coagulants include aluminum sulfate, aluminum chlorohydrate, ferric chloride, ferric sulfate, polyamine, polydiallyldimethylammonium chloride (polyDADMAC), polyaluminum chlorohydrate, and other commercially available coagulants. Similarly, the polymer pumps 210 may deliver cationic and anionic solutions at varying concentrations to the floc tube(s) 60, thereby permitting mixing of wastewater stream 1 and the chemical additives as the wastewater stream 1 passes through the floc tube(s) 60 into the DAF tank 30.

Additionally, a pH pump 220, or a plurality thereof, may be provided for delivery of an alkaline or basic solution, or both, to balance the pH of the wastewater stream 1. As best seen in FIG. 2, a pair of pH pumps 220 may be provided, one at a point in the wastewater stream 1 prior to the floc tube(s) 60 and one at a point downstream of the DAF tank 30, wherein pH can be adjusted both prior to and subsequent to treatment of wastewater stream 1.

FIG. 3 is an example of a human management interface (HMI) for the controller 100 of FIGS. 1-2. As can be seen, the various devices within the system are represented in the HMI (e.g., the DAF tank, chemical feeds and pumps, etc.). The HMI allows the operator to see every value for every controller and process in one screen. It also allows the operator to make changes via a touchscreen (i.e., AUTO— on/off toggle). It also allows the operator to shut off the entire system with one button (i.e., STOP). This screen shows the following: The water flow from a plant is 783 gallons per minute (gpm). The water flow into the DAF tank is 744 gpm. Acid is at 152 PPM and 451 milliliters per minute (mls/min). Chemical pumps P-1600 and P-1402 are disabled. The coagulant is feeding 1114 PPM and the anionic flocculent is feeding 67 PPM. The pH of water going into the DAF tank is 6.16. The effluent going to the city is 138 total suspended solids (TSS) and the set points are 200 max, 150 mid, and 100 min. The time is 19:24:11 PST.

Thus, a plurality of system parameters are shown that may be input to the controller 100 and stored in data memory 104 to customize system operation for a wide variety of wastewater treatment applications. Parameters that may be set by an operator include a maximum turbidity level (NTUmax), a time period (TI) for which NTUmax must be present, a minimum setpoint for coagulant flow (COAGSPI), a maximum setpoint for coagulant flow (COAGSPMAX), and a flow increment rate for coagulant (COAGINC). Additionally, analogous parameters may be set for each additional additive used in the system.

Figure 4A:
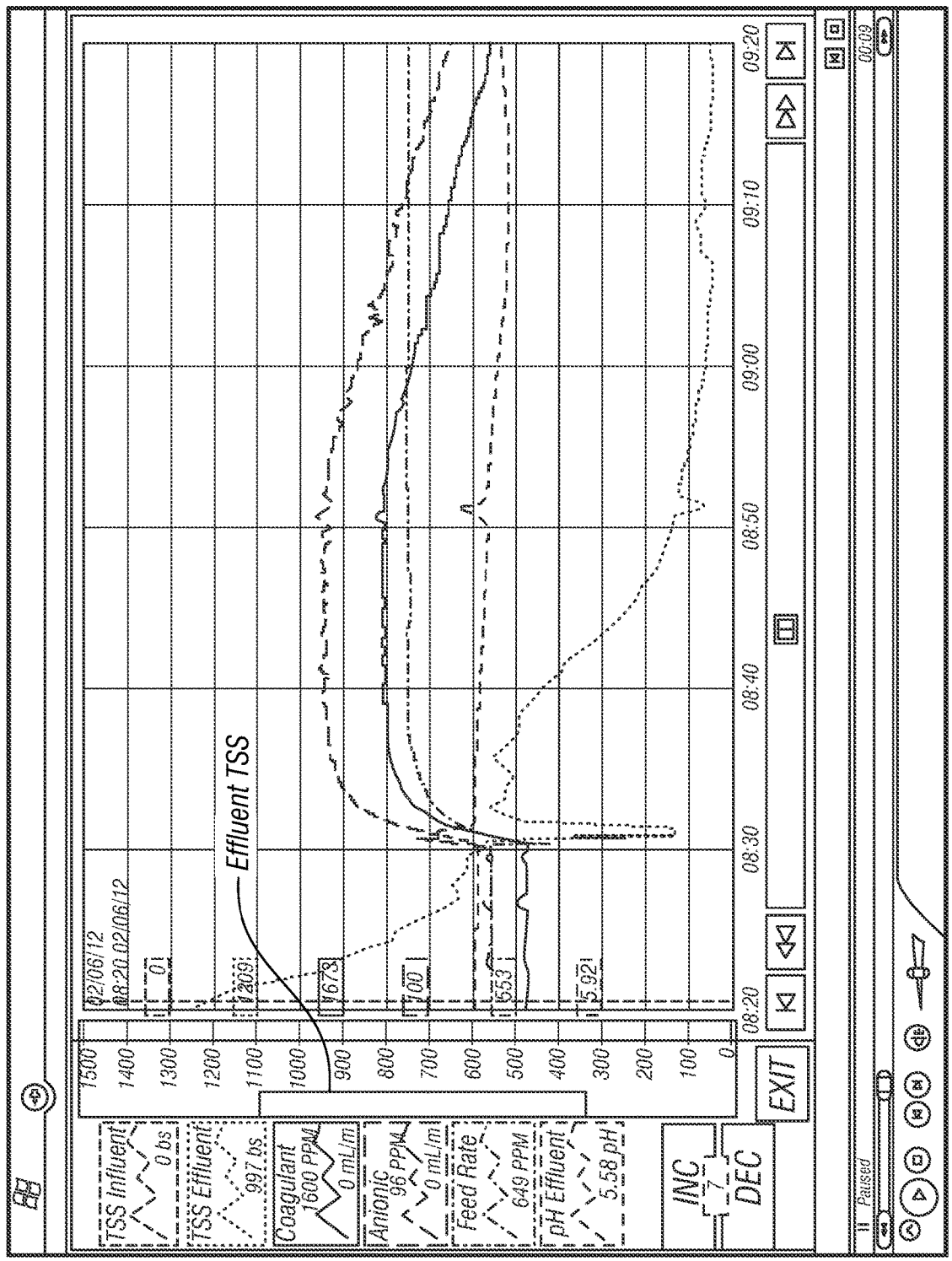
FIGS. 4A-B are graphs showing the parameters that may be considered by a wastewater treatment system and the corrections made by the wastewater treatment system in real time based on those parameters.
Figure 4B:
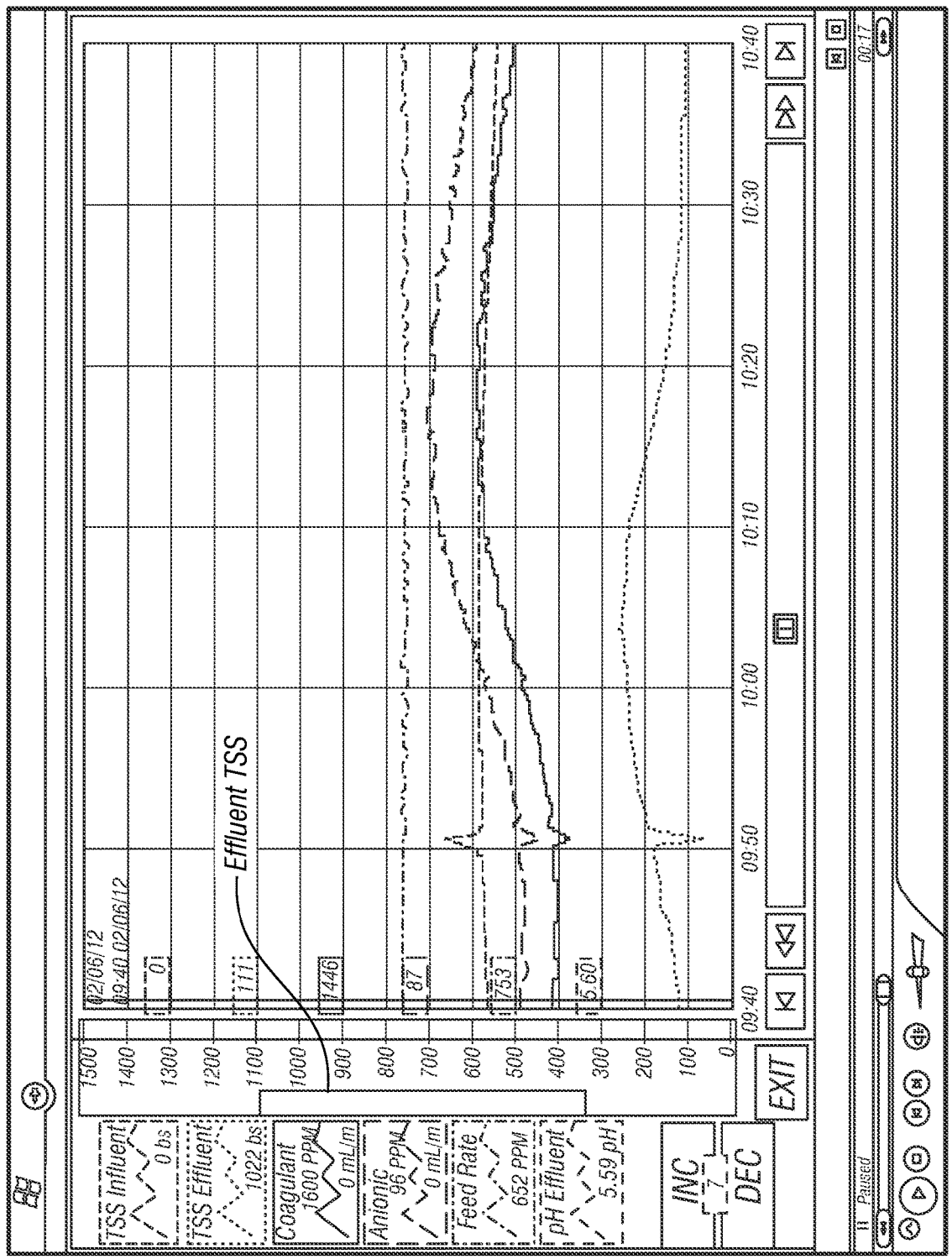

FIGS. 4A and 4B are graphs that show real-time process parameters and corrections according to the invention. For purpose of example only, FIGS. 3 and 4A-B assume the use of a single coagulant additive and a pair of polymer additives. Accordingly, the following parameters may be entered into controller 100 by an operator for each of polymer #1 and polymer #2 respectively: polymer minimum flowrate setpoints (POLY1SPI, POLY2SPI), polymer maximum flowrate setpoints (POLY1SPMAX, POLY2SPMAX), and a flow increment rate for each polymer (POLY1INC, POLY2INC). It should be noted that the flowrates set by an operator may be specified as, for example, a PPM flowrate. These flowrate settings may then be scaled by the controller 100 to provide an output to pumps 200, 210, and 220 that is representative of the number of parts per million selected, based on the flowrate of the wastewater entering the system, as read by the flow transmitter 140.

As can be seen in FIG. 4A, an interval of one hour, from 8:20 to 9:20, is shown. Values for TSS influent, TSS effluent, coagulant, anionic, feed rate, and pH effluent are plotted along the time axis. These values are determined in real time during system operation based on inputs from various sensors, as discussed herein. It can be seen that the values are initially out of line for the TSS effluent, but at 8:30 chemical injection rates are increased and the TSS effluent value is brought under control. In this example, automatic operation was commenced at 8:30.

In FIG. 4B, a spike in values is shown at about 9:50. This is a result of a cleaning operation. For purposes of continued reliability in sensor readings, it may be necessary to perform periodic cleaning of the system components. For example, embodiments of the invention may comprise an automatic cleaning system for the sensors, comprising a clean water source, and a chemical addition system on a timer that interfaces with the controller. In this example, such cleaning is performed daily at the same time (e.g., 9:50).

As one example of parameters that may be provided by the interface 100, 100 percent coagulant solution may be provided at a minimum flowrate setpoint (COAGSPI) of 50 PPM, a maximum flowrate setpoint (COAGMAX) of 100 PPM, and increment (COAGINC) of 0 PPM. Similarly, a 0.05% anionic polymer #1 solution may be provided at a minimum flowrate setpoint (POLY1SPI) of 8 PPM, a maximum flowrate setpoint (POLY1MAX) of 18 PPM, and an increment (POLY1INC) of 2 PPM. Finally, a 0.05% cationic polymer #2 solution may be provided at a minimum flowrate setpoint (POLY2SPI) of 8 PPM, a maximum flowrate setpoint (POLY2MAX) of 26 PPM, and an increment (POLY2INC) of 2 PPM. It will be understood that the above parameters are for purposes of explanation only and are in no way to be construed as limiting of the invention.

The wastewater stream 1 may be efficaciously treated by the system by conducting the following system operations. The steps in the processes described herein are conducted primarily through the application of programming instructions run in the controller 100, responsive to measured process variables supplied to the controller 100 through its inputs 110 and the interface 120.

In accordance with one embodiment of the invention, the turbidity meter 160 may be replaced by a total suspended solids (TSS) sensor 160 (whose measurements are output in terms of NTUs) provided in fluid communication with effluent outlet 50 for measuring the clarity of treated wastewater effluent. The TSS sensor 160 comprises an output 162 that is representative of total suspended solids, as measured by one of several methods, typically provided as a weight per unit volume or parts per million. The output 162 is operatively coupled to an input 110 of the controller 100. In this embodiment of the invention, the system treats a wastewater stream 1 to produce an effluent stream 2 having a contaminant concentration below a predetermined threshold. This embodiment of the invention operates in the same fashion as discussed herein above using turbidity as a variable, except that total suspended solids are used as the control variable of the system.

In this embodiment of the invention, total suspended solids (TSS) are continuously monitored rather than turbidity, either by a single TSS sensor 160 in the effluent stream 2 as shown in FIG. 1, or alternatively by a pair of TSS sensors 160, one in the effluent stream 2 and one disposed between the floc tube(s) 60 and DAF tank 30. Initially, the controller 100 is supplied with a predetermined TSS threshold, TSS max, which may be input through the interface 120.

Accordingly, the invention provides a wastewater treatment system that may be controlled by any desired control variable required to be monitored to treat a particular effluent stream 2.

In a yet further non-limiting embodiment of the invention, biological oxygen demand (BOD) sensors, chemical oxygen demand (COD) sensors, or conductivity meters may be used in plate of the turbidity or TSS sensor 160 to control the system using a plurality of input variables suited for the treatment demands of any given effluent stream 2, In this embodiment of the invention, the operator may still input a maximum acceptable threshold for each control variable in an analogous fashion to that discussed herein above, using turbidity or total suspended solids as control variables.

Figure 5:
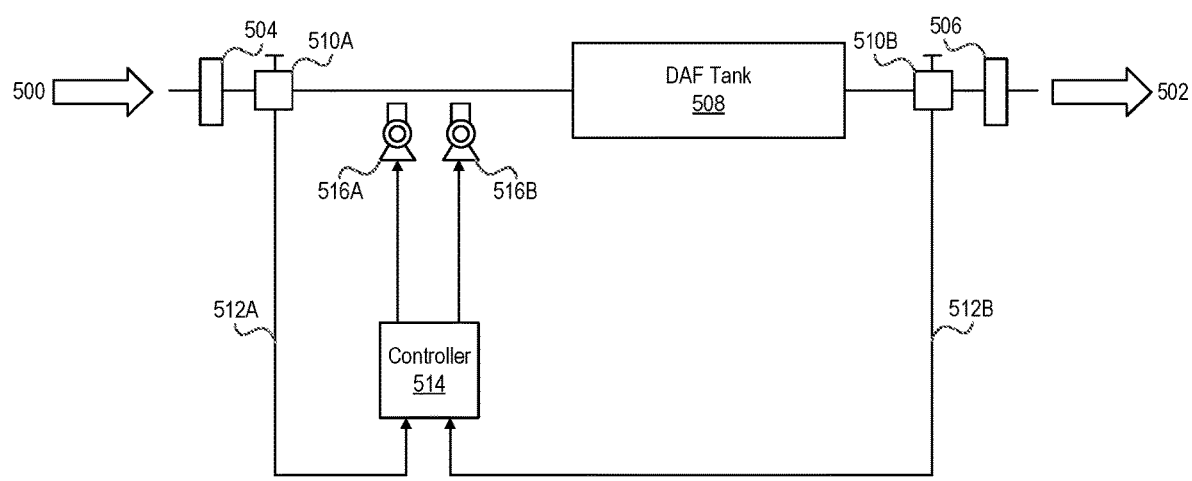
FIG. 5 depicts an example of a system designed to treat a wastewater stream to produce an effluent stream by supplying one or more chemical additives into the wastewater stream at variable flow rates.

FIG. 5 depicts an example of a system designed to treat a wastewater stream 500 to produce an effluent stream 502 by supplying one or more chemical additives into the wastewater stream 500 at variable flow rates. As further discussed below, the chemical additives may be supplied into the wastewater stream 500 at different flowrates.

The wastewater stream 500 is received by the treatment system through an inlet 504, while the effluent stream 502 is diverted away from the treatment system through an outlet 506. In some embodiments, the treatment system includes a DAF tank 508 configured to dissolve air into the wastewater stream 500 under pressure and then releasing the air at atmospheric pressure in a flotation tank basin. The released air forms bubbles that adhere to suspended matter, thereby causing the suspended matter to float to the surface of the flotation tank basin where it can be removed by a skimming device. As noted above, however, the treatment system could be designed to be implemented in conjunction with a filtration system, sedimentation system, clarifier, separator, or equalization tank, in which case the treatment system would not include a DAF tank 508.

One or more sensors 510A-B can be arranged between the inlet 504 and outlet 506. For example, a first sensor 510A may be arranged proximate to the inlet 504 (e.g., upstream of the DAF tank 508) to monitor a characteristic of the wastewater stream 500, and a second sensor 510B may be arranged proximate to the outlet 506 (e.g., downstream of the DAF tank 508) to monitor a characteristic of the effluent stream 502. These sensors 510A-B may be turbidity sensors, TSS sensors, BOD sensors, COD sensors, conductivity sensors, pH sensors, etc. In the case where the treatment system includes multiple sensors, the sensors can be the same type of sensor or different types of sensors. For example, the first and second sensors 510A-B may be turbidity sensors, or the first sensor 510A may be a turbidity sensor while the second sensor 510B may be a pH sensor. Each sensor 510A-B can generate a series of values (referred to as an "output signal" or "output") that is indicative of discrete measurements of a control variable, such as turbidity, TSS, pH, etc.

As shown in FIG. 5, the output signals 512A-B generated by the sensors 510A-B can be provide to a controller 514 responsible for managing one or more chemical additives that are supplied directly into the wastewater stream 500 at variable flowrates. The controller may be a programmable logic controller (PLC) or a proportional-integral-derivative (PID) controller. Here, the treatment system includes two pumps 516A-B, each of which is operable to supply a different chemical additive to the wastewater stream 500 at a corresponding variable flowrate. For example, the controller 514 may cause the first pump 516A to supply a first chemical additive at a first flowrate and the second pump 516B to supply a second chemical additive at a second flowrate different than the first flowrate. Note, however, that the treatment system could include a greater number of pumps or a fewer number of pumps.

When in operation, the controller 514 may monitor the output signals 512A-B generated by the sensors 510A-B to determine how, if at all, the variable flowrates of the chemical additives should be modified. Thus, the controller 514 may parse one or more output signals in real time to address fluctuations in order to bring the effluent stream 502 within a desirable clarity level. In some embodiments, the controller 514 considers output signals generated by other components as well when determining whether to vary the flowrates of the chemical additives. For example, in some embodiments, a flow meter configured to continually measure flow of the wastewater stream 500 is disposed within the wastewater stream 500 (e.g., in or near the inlet 504). In such embodiments, the controller 514 may vary the flowrate of a chemical additive based on flow measurements generated by the flow meter and clarity measurements generated by the sensors 510A-B.

Accordingly, the treatment system can maintain the clarity of the effluent stream 502 within a specified range by causing the pump(s) 516A-B to continually inject the chemical additive(s) into the wastewater stream 500 responsive to adjustments as determined by the controller 514. The pump(s) 516A-B are positioned to inject the chemical additive(s) directly into the wastewater stream 500. Note, however, that mixing instruments, such as floc tubes, could be used to dispense the chemical additive(s) throughout the wastewater stream 500. Generally, any mixing instruments will be located upstream of the DAF tank 508.

Normally, the sensors 510A-B are disposed within the wastewater and/or effluent streams 500, 502. Here, for example, the first sensor 510A is disposed within the wastewater stream 500 while the second sensor 510B is disposed within the effluent stream 502. In other embodiments, however, the treatment system only includes a single sensor disposed within either the wastewater stream 500 or the effluent stream 502. Because the sensors 510A-B are disposed within the wastewater and/or effluent streams 500, 502 and the pump(s) 516A-B supply the chemical additive(s) directly into the wastewater stream 500, the treatment system does not need to draw water from the wastewater or effluent streams 500, 502 for testing. Thus, the treatment system can treat the wastewater stream 502 in real time responsive to adjustments in chemical additive flowrates as determined by the controller 514 rather than wait for a series of jar tests to conclude.

FIG. 6 depicts a flow diagram of a process 600 for treating a wastewater stream to produce an effluent stream. As further discussed below, the process 600 enables the wastewater stream to be treated by a treatment system in a tailored manner without periodically drawing wastewater into reservoirs/jars for testing. Initially, a pump can supply a chemical additive to the wastewater stream at a variable flow rate (step 601).

Then, the treatment system can continuously measure clarity of the wastewater stream and/or an effluent stream produced from the wastewater stream (step 602). For example, a sensor disposed within the wastewater stream may be configured to measure clarity of the wastewater stream as it passes. Similarly, a sensor disposed within the effluent stream may be configured to measure clarity of the effluent stream as it passes. These sensors may be BOD sensors, COD sensors, conductivity sensors, pH sensors, TSS sensors, turbidity sensors, or any combination thereof. In embodiments where a first sensor is disposed within the wastewater stream and a second sensor is disposed within the effluent stream, the first and second sensor may be the same type of sensor or different types of sensors.

Moreover, the treatment system can continuously measure flow of the wastewater stream (step 603). Generally, this is accomplished by monitoring the flow measurements generated by a flow meter disposed within the wastewater stream. However, the flow could be established in other ways (e.g., visually using dyes).

The treatment system can then vary the variable flow rate of the chemical additive based on the clarity measurements generated by the sensor(s) and/or the flow measurements generated by the flow meter (step 604). For example, the output(s) produced by the sensor(s) may be operatively coupled to an input of a controller, and the controller may be configured to change the chemical dosing responsive to determining that the output exceeds a threshold, that the output has changed by more than a certain amount within a given interval of time, etc.

These steps (i.e., steps 601-604) may be performed continuously over time. Thus, the treatment system may maintain clarity of the effluent stream within a specified range by continually injecting the chemical additive into the wastewater stream responsive to adjustments specified by the controller in real time (step 605).

In some embodiments, the treatment system (and, more specifically, the controller) is instructed to meet a performance objective, a costing objective, or a combination of performance and costing objectives. For example, the controller may be set to ensure an acceptable level of chemical additive over-shooting where compliance with an effluent standard is required. Alternatively, the controller may be set to minimize chemical additive over-shooting where cost efficiency is a higher priority than compliance with an effluent standard. As further discussed above, the controller may implement various dosing schemes to accomplish different objectives.

Other steps may be included in some embodiments. For example, the treatment system may include a coagulant pump operable to supply a coagulant to the wastewater stream, a polymer pump operable to supply a polymer to the wastewater stream, and/or a pH additive pump operable to supply an acidic solution or an alkaline solution to the wastewater stream in addition to, or instead of, the chemical additive pump. As another example, the treatment system may include multiple pumps operable to supply different chemical additives to the wastewater stream. In such embodiments, the controller may be able to independently vary the flow rate of each pump (e.g., each chemical additive pump, coagulant pump, polymer pump, pH additive pump, etc.), or the controller may simply vary the flow rate of a single pump (referred to as a "control pump") and then alter the other flow rates proportional to this flow rate.

FIG. 7 depicts a flow diagram of another process 700 for treating a wastewater stream to produce an effluent stream. Similar to the process 600 of FIG. 6, the process 700 enables the wastewater stream to be treated by a treatment system in a tailored manner without periodically drawing wastewater into reservoirs/jars for testing.

Initially, the treatment system can produce a flow rate value by continually measuring flow of the wastewater stream (step 701). Generally, flow of the wastewater stream is measured by a flow meter disposed in the wastewater stream (e.g., near an inlet of the treatment system). However, flow could be measured in other ways. Moreover, the treatment system can produce a clarity value by continually measuring clarity of the wastewater stream by sampling directly from the wastewater stream (step 702). Additionally or alternatively, the treatment system can produce a clarity value by continually measuring clarity of the effluent stream by sampling directly from the effluent stream.

A controller can then determine an appropriate chemical additive flow rate needed to achieve a desired effluent quality level based on the flow rate value and the clarity value (step 703). For example, the controller may be designed to examine clarity measurements generated by a TSS sensor in real time. Upon determining that the clarity measurements exceed a threshold, the controller may increase the chemical additive flow rate in an effort to decrease the number of suspended solids detected by the TSS sensor. In some embodiments, alterations of the chemical additive flow rate are based on the clarity measurements themselves. For example, the controller may alter the chemical additive flow rate based on how much the clarity has changed over a given interval of time. In other embodiments, alterations of the chemical additive flow rate are made gradually/incrementally so that the controller can observe how, if at all, each alteration is affecting clarity. For example, the controller may increase the chemical additive flow rate by one PPM every thirty seconds until it determines that the desired effluent quality level has been achieved. After determining the appropriate chemical additive flow rate, the controller can output a signal to a pump that causes an amount of chemical additive to be injected into the wastewater stream (step 704).

Thereafter, the treatment system can continually monitor the flow rate value and/or the clarity value in real time to determine whether an adjustment to the amount of chemical additive is needed to maintain clarity of the effluent stream at a substantially steady level after reaching the specified effluent quality level (step 705). That is, the treatment system can continually monitor the flow rate value and/or the clarity value so that variations in clarity of the effluent stream can be addressed in real time by varying the amount of chemical additive being injected into the wastewater stream.

Note that, in some embodiments, the treatment system may be designed to treat the wastewater stream in accordance with a treatment regimen regulated by a predetermined series of clarity thresholds. Each pair of clarity thresholds defines a clarity range. As further discussed below, the treatment system may vary the amount of chemical additive being injected into the wastewater stream only if the clarity value moves from one range to another range. Thus, rather than dynamically adjust the flowrate of each chemical additive based on the clarity value, the treatment system may continually compare the clarity value to the series of clarity thresholds to determine what change, if any, is needed in the amount of chemical additive being injected into the wastewater stream. Initially, the treatment system can produce a first clarity value by measuring clarity of the wastewater stream at a first point in time by sampling directly from the wastewater stream. Then, the treatment system can compare the first clarity value to a series of clarity thresholds to identify a range in which the first clarity value resides. For example, if the first clarity value is measured in terms of milligrams per liter (mg/L) TSS, the series of clarity thresholds may be every 10 mg/L from 100 mg/L TSS to 300 mg/L TSS. In this example, there would be 20 clarity ranges. Thereafter, the treatment system can produce a second clarity value by measuring clarity of the wastewater stream at a second point in time by sampling directly from the wastewater stream. As discussed above, the treatment system may monitor clarity of the wastewater stream in real time, so the first and second clarity values may be produced within several seconds (e.g., 3, 5, 10, or 15 seconds) of one another. Then, the treatment system can compare the second clarity value to the series of clarity values to identify a range in which the second clarity value resides. If the first and second clarity values reside in the same range, then the treatment system may continue dosing the wastewater stream with the same amount of chemical additive(s). However, the first and second clarity values reside in different ranges, then the treatment system may vary the amount of chemical additive(s) being injected into the wastewater stream. In some embodiments, the series of clarity thresholds is associated with a programmed dosing schedule, where each range of clarity values is associated with a different amount of chemical additive(s) to be injected into the wastewater stream. In such embodiments, the treatment system may employ the programmed dosing schedule so that the appropriate amount of chemical additive(s) does not need to be dynamically calculated in real time.

Use Cases

Several use cases involving the treatment system described herein are provided below. These use cases are provided for the purpose of illustration only.

In a first example, a treatment system was installed at a facility designed to process/render chicken that handles approximately 3.2 million gallons per day (Mgal/d) of wastewater, which is equal to about 2,222 gallons per minute (gal/min). Previously, the facility had employed a conventional treatment system that included an equalization tank having a volume of 20,000 gallons with 9 minutes of retention on average. Contaminants in the wastewater included oil/grease, Total Kjeldahl Nitrogen (TKN), phosphorous, proteins, and other organic materials. The facility had been out of compliance with discharge regulations for several years. The high equalization time (i.e., 9 minutes) made it impossible to set appropriate flowrates of chemical additives due to (1) variations in the flow of the wastewater stream and (2) variations in the percent of contaminants in the wastewater stream. With the treatment system described herein, the wastewater has been treated in real time without overuse of chemical additives. In fact, real-time measuring of the clarity and flow of the wastewater has allowed the treatment system to be compliant with the discharge regulations for the last six years.

In a second example, a treatment system was installed at a facility designed to process foods (e.g., sausage, breakfast sandwiches, and potato gravy) that handles approximately 160,000 gal/d of wastewater. Previously, the facility had employed a conventional treatment system that included an equalization tank having a volume of 40,000 gallons with 6 hours of retention on average. Contaminants in the wastewater included oil/grease, TSS, and COD. The facility had been in and out of compliance with discharge regulations for over two years, and the facility had been getting surcharges for the TSS and COD overages. Variations in the contaminants made it impossible to treat the wastewater in a cost-effective manner. The treatment system described herein was installed at the facility over three years ago, and the wastewater has been compliant with the discharge regulations since then. Moreover, the treatment system has been able to treat the wastewater without any extra chemical additives, so the surcharges for the TSS and COD overages have been eliminated.

In a third example, a treatment system was installed at a facility designed to process/render pork that handles approximately 100,000 gal/d of wastewater. Previously, the facility had employed a conventional treatment system that included an equalization tank having a volume of 100,000 gallons. Contaminants in the wastewater included oil/grease, TSS, TKN, and BOD. By installing the treatment system described herein, retention of the equalization tank was lowered to under an hour on average and perfect dosages for the chemical additives were attained. The term "perfect dosage," as used herein, refers to a dosage that allows compliance with the relevant discharge regulations to be attained. Those skilled in the art will recognize that multiple dosages could be considered "perfect dosages" for a given set of constraints (e.g., wastewater clarity, wastewater flow, contaminants). With the lowered equalization time, the biological nitrogen was not converted into ammonia in exceedance for the TKN. Without the treatment system, it would not have been possible to set a feed rate for each chemical additive that kept TSS and BOD compliant.

In a fourth example, a treatment system was installed at a rendering facility that handles approximately 50,000 gap/d of wastewater. Previously, the rendering facility had employed a conventional treatment system that included an equalization tank having a volume of 1,500 gallons. Contaminants in the wastewater included oil/grease, TSS, and BOD. The rendering facility had been receiving fines for continual violations of discharge regulations related to the amount of oil/grease and BOD in the effluent. With the treatment system described herein, the rendering facility has been able to address these issues. The treatment system was installed over two years ago, and no fines have been received in that time.

In a fifth example, a treatment system was installed at a facility designed to process milk, cream, and soymilk that handles approximately 460,000 gal/d of wastewater. Previously, the facility had employed a conventional treatment system that included an equalization tank having a volume of 40,000 gallons. Contaminants in the wastewater included oil/grease, COD, and TSS. This facility is located in a city with extremely high charges for exceeding the COD and TSS discharge regulations, and the oil/grease discharge regulation has a very low threshold—100 PPM. The facility has several production lines whose products change over the course of each day, so the flow and contaminant level of the wastewater varies widely. The treatment system described herein was installed at the facility over four years ago. Since then, no violations of the oil/grease discharge regulation have occurred, and the costs of treating the wastewater have been lowered (e.g., by lessening chemical additive usage, sludge production, and surcharges).

In a sixth example, a treatment system was installed at a facility designed to manufacture vitamins that handles approximately 80,000 gal/d of wastewater. Previously, the facility had employed a conventional treatment system that included an equalization tank having a volume of 10,000 gallons. Contaminants in the wastewater included TSS and BOD. The facility has an extremely wide variation in the amount of contaminants in the wastewater. Moreover, this facility does a lot of cleaning throughout each day (e.g., by flushing the production lines with clean water), so there will periodically be high volumes of wastewater with very low concentrations of contaminants. These factors make it extremely difficult to establish the appropriate level of chemical dosing. With the treatment system described herein, the facility has been able to achieve accurate chemical dosing.

In a seventh example, a treatment system was installed at a facility designed to produce beef products (e.g., hamburger patties) that handles approximately 800,000 gal/d of wastewater. Previously, the facility had employed a conventional treatment system that included an equalization tank having a volume of 240,000 gallons. Contaminants in the wastewater included oil/grease, TSS, and COD. This facility had historically had a difficult time meeting the COD discharge regulation. Even though the facility had a large equalization tank, the contaminant levels in the wastewater varied greatly. For example, oil was floating while the solids were settling at varying rates, which made it difficult to establish the appropriate level of chemical dosing. With the treatment system described herein, the facility has been able to consistently meet the COD discharge regulation without overdosing of the chemical additives.

Processing System

Figure 8:
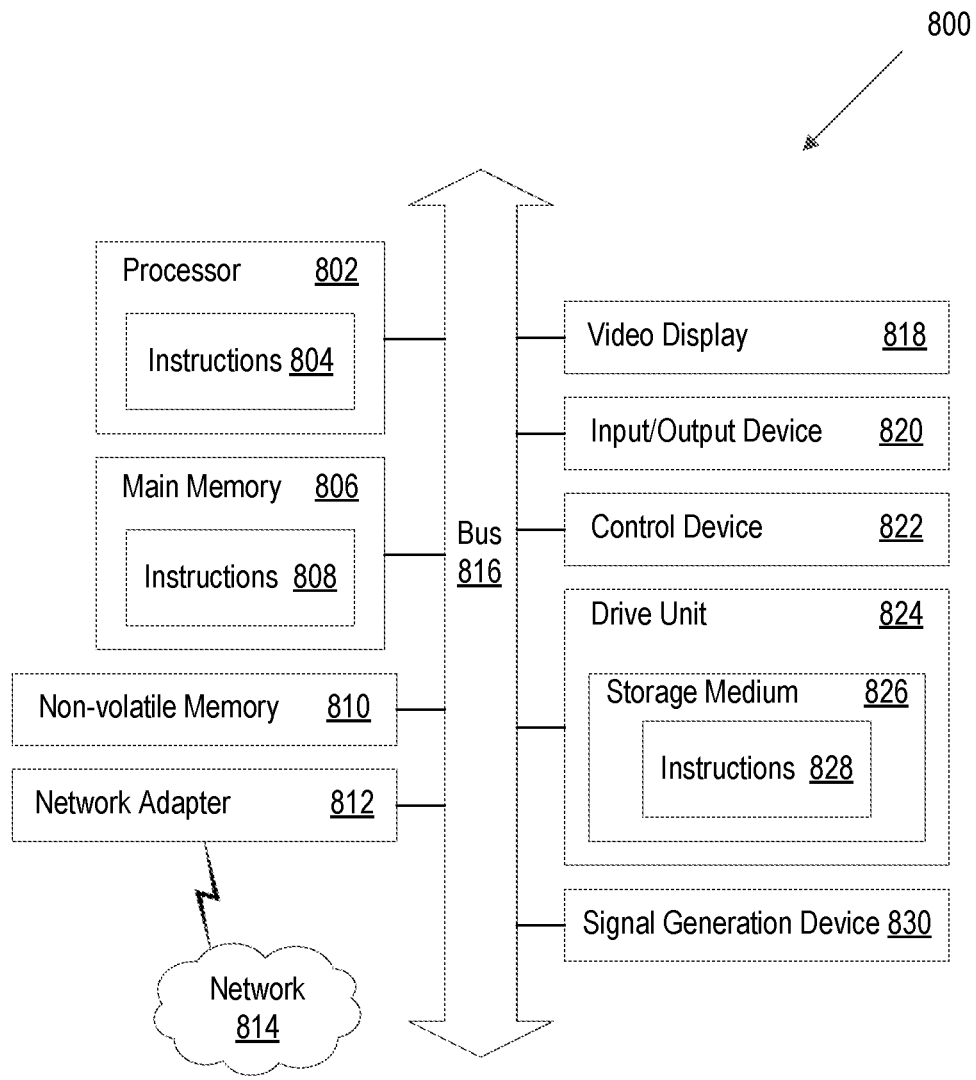
FIG. 8 is a block diagram illustrating an example of a processing system in which at least some operations described herein can be implemented.

FIG. 8 is a block diagram illustrating an example of a processing system 800 in which at least some operations described herein can be implemented. For example, components of the processing system 800 may be hosted on a treatment system designed to treat a wastewater stream to produce an effluent stream, or on a computing device that is communicatively connected to the treatment system (e.g., via a wired connection or a wireless connection).

The processing system 800 may include one or more central processing units ("processors") 802, main memory 806, non-volatile memory 810, network adapter 812 (e.g., network interface), video display 818, input/output devices 820, control device 822 (e.g., keyboard and pointing devices), drive unit 824 including a storage medium 826, and signal generation device 830 that are communicatively connected to a bus 816. The bus 816 is illustrated as an abstraction that represents one or more physical buses and/or point-to-point connections that are connected by appropriate bridges, adapters, or controllers. The bus 816, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The processing system 800 may share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the processing system 800.

While the main memory 806, non-volatile memory 810, and storage medium 826 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 828. The term "machine-readable medium" and "storage medium" shall also be taken to include any medium that is capable of storing, encoding, or carrying a set of instructions for execution by the processing system 800.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 804, 808, 828) set at various times in various memory and storage devices in a computing device. When read and executed by the one or more processors 802, the instruction(s) cause the processing system 800 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 810, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 812 enables the processing system 800 to mediate data in a network 814 with an entity that is external to the processing system 800 through any communication protocol supported by the processing system 800 and the external entity. The network adapter 812 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 812 may include a firewall that governs and/or manages permission to access/proxy data in a computer network, and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

REMARKS

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method for treating a wastewater stream to produce an effluent stream without periodically drawing samples for testing, the method comprising:
    supplying, by a pump, a chemical additive to the wastewater stream at a variable flow rate;
    measuring, by a sensor disposed within the wastewater stream, clarity of the wastewater stream continuously to produce a series of clarity measurements over an interval of time;
    measuring, by a flow meter disposed within the wastewater stream, flow of the wastewater stream continuously to produce a series of flow measurements over the interval of time;
    varying, by a controller, the variable flow rate at which the chemical additive is supplied to the wastewater stream based on an analysis of (i) the series of clarity measurements generated by the sensor and (ii) the series of flow measurements generated by the flow meter, such that the controller is able to address, in real time,
        (a) changes in the clarity of the wastewater stream that are not accompanied by a corresponding change in the flow of the wastewater stream to limit underdosing,
        (b) changes in the flow of the wastewater stream that are not accompanied by a corresponding change in the clarity of the wastewater stream to limit overdosing, and
        (c) changes in the clarity of the wastewater stream that are accompanied by a corresponding change in the flow of the wastewater stream; and
    maintaining clarity of the effluent stream within a specified range of values by continuously supplying, by the pump, the chemical additive into the wastewater stream in accordance with the variable flow rate as determined by the controller.

2. The method of claim 1, wherein the controller is selected from:
    a programmable logic controller (PLC); and
    a proportional-integral-derivative (PID) controller.

3. The method of claim 1, wherein the sensor is selected from:
    a biological oxygen demand (BOD) sensor;
    a chemical oxygen demand (COD) sensor;
    a conductivity sensor;
    a potential of hydrogen (pH) sensor;
    a total suspended solids (TSS) sensor; and
    a turbidity sensor.

4. The method of claim 1, further comprising:
    supplying, by a coagulant pump, a coagulant to the wastewater stream at a first variable flow rate; and
    supplying, by a polymer pump, a polymer to the wastewater stream at a second variable flow rate.

5. The method of claim 1, further comprising:
    continuously measuring, by a second sensor disposed within the effluent stream, clarity of the effluent stream.

6. The method of claim 5, further comprising:
    operatively coupling an output of the second sensor representative of the effluent clarity to an input of the controller,
    wherein the controller is configured to change the chemical dosing in response to determining that the output exceeds a specified threshold.

7. The method of claim 1, wherein the sensor is disposed downstream of a plurality of flocculent tubes.

8. The method of claim 1, wherein the sensor is a pH sensor in fluid communication with the wastewater stream having an output representative of pH of the wastewater stream that is operatively coupled to an input of the controller.

9. The method of claim 8, further comprising:
    supplying, by a pH additive delivery pump, an acidic solution or an alkaline solution to the wastewater stream based on the output of the pH sensor.

10. The method of claim 1, wherein the sensor is connected to an automatic cleaning system that includes
    a clean water source, and
    a chemical addition system on a timer that interfaces with the controller.

11. The method of claim 1, further comprising:
    setting the controller to meet a performance objective, a costing objective, or a combination of performance and costing objectives.

12. A method for treating a wastewater stream to produce an effluent stream, the method comprising:
    determining, by a controller, a rate at which to supply a chemical additive to the wastewater stream;
    varying, by the controller, the rate at which the chemical additive is supplied to the wastewater stream in real time based on
        (i) a first stream of values output by a sensor that continuously measures clarity of the wastewater stream at least every 60 seconds, and
        (ii) a second stream of values output by a flow meter that continuously measures flow of the wastewater stream at least every 60 seconds,
        wherein the first and second streams of values are analyzed independently, such that the controller is able to address (i) discharges in which variations in the clarity do not correspond to proportional variations in the flow and (ii) discharges in which variations in the flow do not correspond to proportional variations in the clarity, allowing the wastewater stream to be treated without underdosing or overdosing with the chemical additive; and outputting a signal that causes a pump to inject the chemical additive into the wastewater stream in accordance with the varied rate, so as to dynamically address variations in the clarity and the flow of the wastewater stream.

13. The method of claim 12, wherein said varying is based on how much the clarity of the wastewater stream has changed over an interval of time.

14. The method of claim 12, wherein said determining comprises:

initiating the pump so that the chemical additive is injected into the wastewater stream at an initial rate, incrementing the initial rate by a predetermined amount at a predetermined frequency over an interval of time, so as to cause the pump to inject the chemical additive into the wastewater stream at different rates, and establishing the rate based on an analysis of how the different rates affect clarity of the effluent stream.

15. The method of claim 12, wherein said varying comprises:

for each value in the first stream of values, comparing the value to a series of clarity ranges to identify a clarity range in which the value resides, and establishing how to vary the flow rate based on the clarity range, wherein the series of clarity ranges is associated with a programmed dosing schedule in which each clarity range is associated with a different amount of the chemical additive to be injected into the wastewater stream.

16. The method of claim 12, wherein the sensor continuously measures clarity of the wastewater stream at least every 30 seconds, and wherein the flow meter continuously measures flow of the wastewater stream at least every 30 seconds.

17. The method of claim 16, wherein the sensor continuously measures clarity of the wastewater stream at least every 15 seconds, and wherein the flow meter continuously measures flow of the wastewater stream at least every 15 seconds.

* * * * *